(12) United States Patent
Valasma et al.

(10) Patent No.: US 9,629,011 B2
(45) Date of Patent: Apr. 18, 2017

(54) SYSTEM FOR TESTING BASE STATION (71) Applicant: Sarokal Test Systems Oy, Oulu (FI)

(72) Inventors: Harri Valasma, Oulu (FI); Kari Vierimaa, Kempele (FI)

(73) Assignee: Sarokal Test Systems Oy, Oulu (FI)

( * ) Notice: Subject to any disclaimer, the term of this patent is extended or adjusted under 35 U.S.C. 154(b) by 0 days.

(21) Appl. No.: 14/738,403

(22) Filed: Jun. 12, 2015

(65) Prior Publication Data

US 2015/0365837 A1  Dec. 17, 2015

(30) Foreign Application Priority Data

Jun. 17, 2014 (EP) ..................... 14172776

(51) Int. Cl.
*H04W 24/08* (2009.01)
*H04W 4/00* (2009.01)
*H04W 24/06* (2009.01)
*H04W 88/08* (2009.01)

(52) U.S. Cl.
CPC ........... *H04W 24/08* (2013.01); *H04W 4/003* (2013.01); *H04W 24/06* (2013.01); *H04W 88/08* (2013.01)

(58) Field of Classification Search
CPC . G06F 13/14; H04W 72/0453; H04W 72/087; H04W 24/08
See application file for complete search history.

(56) References Cited

U.S. PATENT DOCUMENTS

| 6,269,319 B1 * | 7/2001 | Neisch ................. G01R 31/008 702/118 |
| 8,418,000 B1 | 4/2013 | Salame |
| 2013/0346637 A1 * | 12/2013 | Zadigian ............... G06F 13/385 710/10 |

OTHER PUBLICATIONS

Van Treuren et al., "JTAG-Based Vector and Chain Management for System Test", IEEE International Conference, pp. 1-10 (Nov. 8, 2005).
Sarokal: "RBS Protocol Test System", XP055135871, Retrieved from the Internet: URL:http://www.iss.se/files/2/Sarokal_RBS_Protocol_Test_System_Datasheet.pdf, pp. 1-2 (Apr. 1, 2014).
Sarokal: "Sarokal Test Systems", XP002728752, Retrived from the Internet: URL:http://www.sarokal.fi, pp. 1-6 (Apr. 23, 2014).
European Search Report for corresponding European Application No. EP14172776, pp. 1-3 (Aug. 27, 2014).

* cited by examiner

*Primary Examiner* — Myron K Wyche
(74) *Attorney, Agent, or Firm* — Hoffmann & Baron, LLP (57) ABSTRACT A system for testing a base station apparatus includes a circuit board frame including a plurality of interfaces for a plurality of testing modules, and a central processing circuitry. The plurality of testing modules is detachably attachable to the interfaces, and each testing module comprises hardware that is configured to connect a determined interface of the base station apparatus and a reprogrammable processing circuitry. The central processing circuitry is configured to detect testing modules attached to the circuit board frame, determine a testing program to execute, and to program reprogrammable processing circuitries of the detected testing modules to execute testing functions of the testing program.

12 Claims, 4 Drawing Sheets

SYSTEM FOR TESTING BASE STATION

CROSS-REFERENCE TO RELATED APPLICATION

This application claims benefit to European Application No. 14172776.8, filed Jun. 17, 2014, which is incorporated by reference herein in its entirety.

BACKGROUND

Field

The invention relates to base station testing systems.

Description of the Related Art

Conventional systems for testing operation and performance of a base station of a wireless communication system typically comprise several testing devices. Each testing device typically is dedicated to test a single feature or protocol of the base station. Such testing devices may include a digital signal generator having a dedicated protocol interface to connect with the base station, a network analyser configured to monitor the performance of the base station on a certain protocol layer, etc.

SUMMARY

The invention is defined by the independent claims. Embodiments are defined in the dependent claims.

BRIEF DESCRIPTION OF THE DRAWINGS

In the following the invention will be described in greater detail by means of preferred embodiments with reference to the accompanying drawings, in which.

DETAILED DESCRIPTION

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
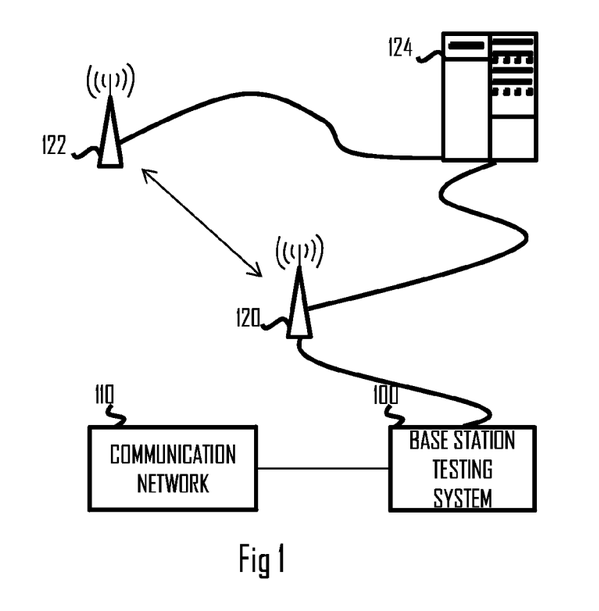
FIGS. 1 and 2 illustrate testing scenarios to which embodiments of the invention may be applied.

FIG. 1 illustrates a scenario to which embodiments of the invention may be applied. Referring to FIG. 1, a base station 120 may be a part of a radio access network of a wireless communication system, e.g. a cellular communication system. The wireless communication system may operate according to specifications of Universal Mobile Telecommunication System or any one of its evolution versions, e.g. Long-Term Evolution (LTE) or LTE-Advanced, a second generation mobile telecommunication system such as Global System for Mobile Communications, or a system operating strictly on unlicensed frequency bands. An example of a system operating on the unlicensed bands is IEEE 802.11 (Wi-Fi) and, as a consequence, the base station may be considered broadly as an access point providing a terminal device with wireless access to other networks such as the Internet.

The base station 120 may be connected to a core network 124 of the wireless communication system and, in some embodiments, to at least one other base station 122 of the wireless communication system. The base stations 120, 122 may belong to the same wireless communication network or a different network, e.g. networks of different operators. The base stations 120, 122 may be neighbouring base stations and have established a wired or wireless direct connection there between, e.g. over an X2 interface of LTE systems. In other embodiments, the base stations 120, 122 may be remote and communicate with each other through the core network 124.

The base station may comprise a radio equipment controller configured to control one or more radio equipment of the base station. Radio equipment may carry out link layer and physical layer signal processing when transmitting and receiving radio signals. An interface between the radio equipment may be a Common Public Radio Interface (CPRI), Open Base Station Architecture Initiative (OBSAI), or Ethernet, for example. The radio equipment controller may thus be considered as a server common to a plurality of radio equipment, wherein at least some of the radio equipment may be so-called remote radio heads (RRH) disposed at remote locations with respect to the radio equipment controller. Each radio equipment may be connected to a radio head comprising at least antenna(s), and the interface there between may be JESD204B, for example. The radio equipment controller may further be connected to the core network through another interface, and the interface may be the Ethernet or CPRI, for example.

A testing system 100 may be connected to one or more interfaces of the base station 120 so as to test one or more features or performance of the base station 120. Examples of the interfaces include an interface between the radio equipment controller and the radio equipment, the interface between the radio equipment controller and the core network, the interface between the radio equipment and the antenna. The base station 120 may comprise physical connectors to which a testing system 100 may be connected in order to test the operation and performance of the base station. Such physical connectors may include BNC connectors, optical connectors such as LC, SMA connectors, RJ45 connectors, small form-factor (SFP or SFP+) connectors, quad SFP(+) connectors etc. connectors conventionally used in the interfaces to which the testing system 100 may be connected.

Figure 2:
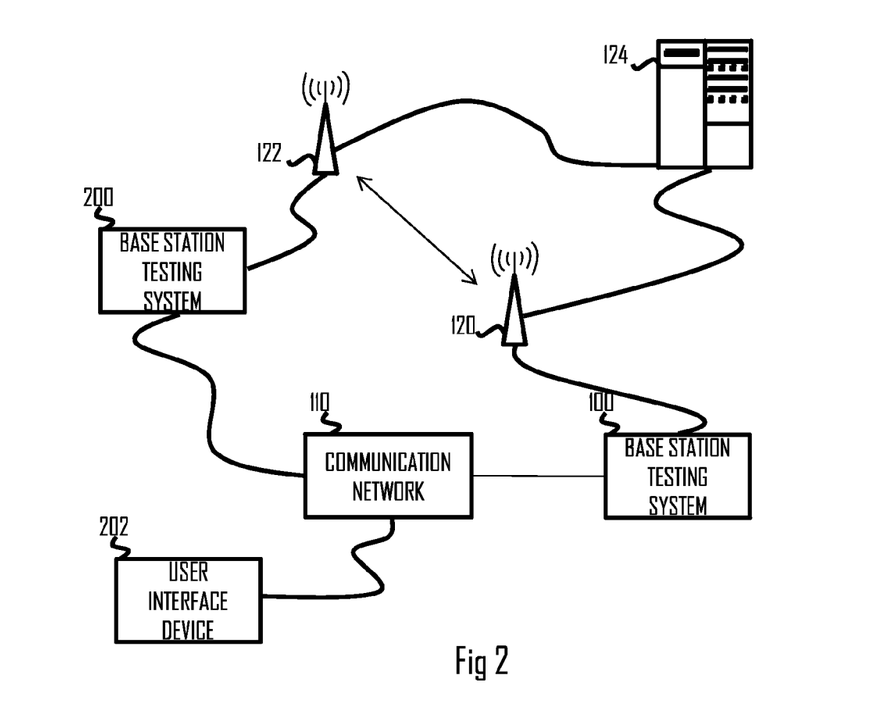

The testing system 100 may comprise a network interface connecting the testing system 100 to a communication network 110. The communication network 110 may comprise a local area network (LAN), a wide area network (WAN), and/or the Internet. The network interface may enable remote controlling of the testing system, connection with a remote database storing test programs and/or test results, and/or communication between two or more mutually remote testing systems. FIG. 2 illustrates such a testing scenario comprising a plurality of testing systems 100, 200 connected to respective base stations 120, 122. The testing systems 100, 200 may be configured to communicate with each other through the communication network(s) 110. A user interface device 202 such as a personal computer or a laptop computer may be connected to the communication network 110 and configured to control the testing of at least one of the base station testing systems 100, 200 according to some embodiments described herein.

In an embodiment, the testing system(s) 100, 200 is/are used to test wired communication protocols used in a telecommunication network, e.g. passive optical networks (PON) such as Ethernet PON or Gigabit-capable PON.

A problem with conventional testing devices is that each device is dedicated to test a single interface and its communication protocol(s). One test device is typically a test input device inputting test signals to a device under test (DUT), e.g. the base station, and another device is a test output receiver receiving responses to the test signals from the DUT. In combination with the facts that a single base station may support multiple protocols, have multiple interfaces and that there are in general numerous different protocols and their evolution versions, the number of required testing devices increases. This increases the complexity and costs of the testing. A typical conventional testing system comprises hardware and software, and the hardware is integrated to a testing device. This causes the fact that the software is also dedicated to control the integrated hardware, which makes the system dedicated to the single testing setup defined by the limitations of the hardware.

Figure 3:
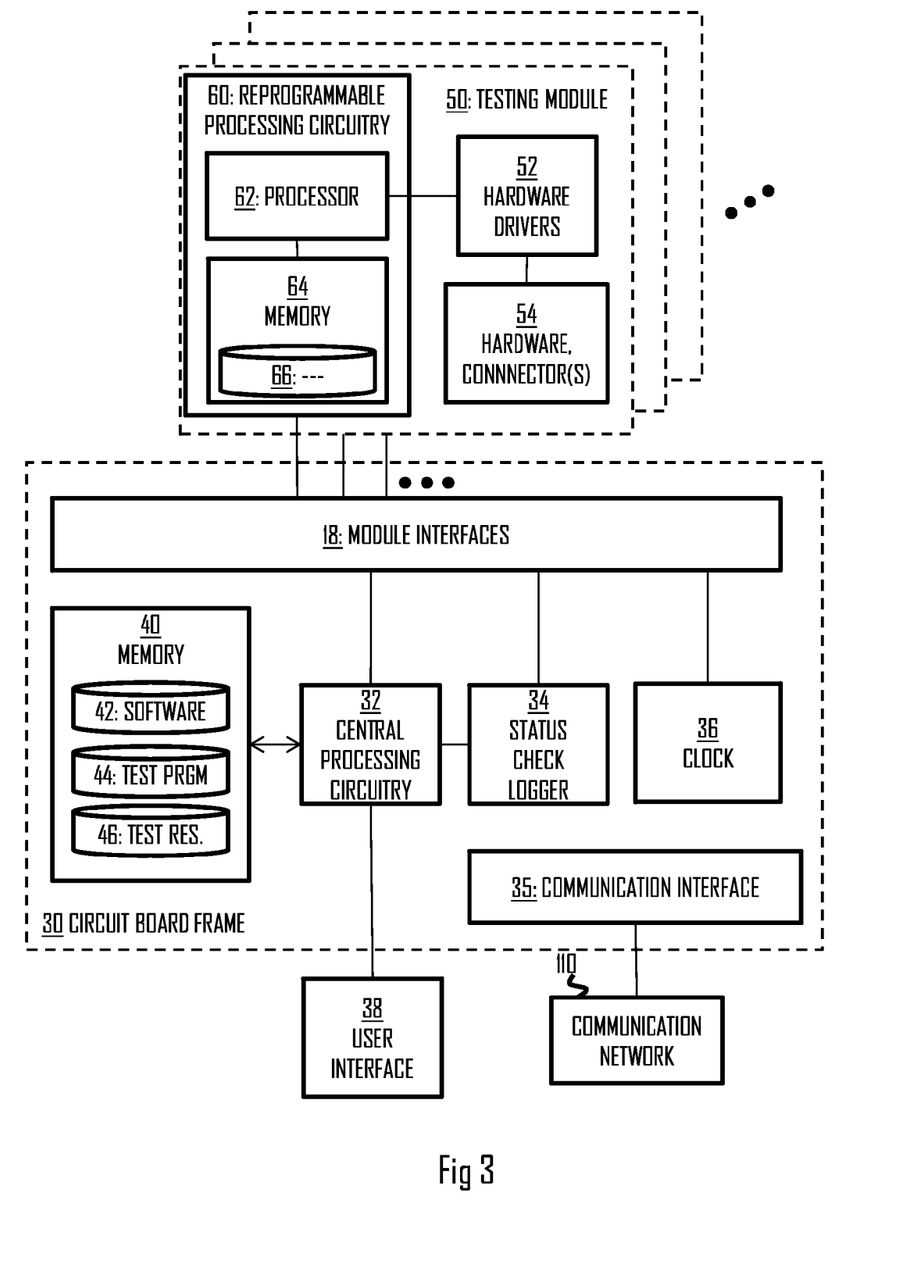
FIG. 3 illustrates a modular testing system according to an embodiment of the invention.

Embodiments of the invention provide a system for testing a base station apparatus. FIG. 3 illustrates an embodiment of such a system. Referring to FIG. 3, the system comprises a circuit board frame 30 comprising a plurality of interfaces 18 for a plurality of testing modules 50 and a central processing circuitry 32. The system further comprises said plurality of testing modules 50 detachably attachable to the interfaces 18. Each testing module 50 comprises hardware 52, 54 configured to connect a determined interface of the base station apparatus and a reprogrammable processing circuitry 60. The central processing circuitry 32 is configured to detect testing modules 50 attached to the circuit board frame 30, to determine a testing program to execute, and to program reprogrammable processing circuitries 60 of the detected testing modules 50 to execute testing functions of the testing program.

The embodiment of FIG. 3 enables assembly of a test-specific hardware and software configuration with a single apparatus comprising the circuit board frame 30 to which the testing modules 50 may be attached. This enables creation of a test-specific hardware configuration with the same circuit board frame and a selected subset of testing modules. As a consequence, different interfaces and different protocols and operational features of the base station may be tested by simply changing the testing modules attached to the circuit board frame and by programming the reprogrammable processing circuitries of the attached testing modules. A further advantage is that the central processing circuitry and the circuit board frame may be used as a common hardware component for each test setup, thus reducing the size and the costs of the required testing equipment. It also enables the better reconfiguration options for the software components of the testing system. A further advantage is that the same testing device or even the same testing module may be programmed to be used as test input generator or a test output receiver, and this may be carried out without changing any hardware module and/or without disconnecting the device from the device under test.

In an embodiment, the testing modules are card-type of modules attachable to corresponding counterpart slots or receptables in the circuit board frame 30. The module may be connected through any suitable high data speed hardware connector such as one used for wired Ethernet connection or another wired or bus connection. One option is to use a wireless connection, too. Let us further describe some embodiments of the testing system of FIG. 3. In an embodiment, the circuit board frame comprises a communication interface 35 providing the connection to the communication network(s) 110. In some embodiments, the communication interface 35 comprises a wireless modem supporting IEEE802.11 protocol or a cellular communication protocol such as UMTS LTE. In other embodiments, the communication interface comprises a wired modem supporting Digital Subscriber Line (DSL) connections, for example.

In an embodiment, the circuit board frame 30 comprises a clock signal generator 36 configured to provide a clock signal. The circuit board frame 30 may be configured to connect the clock signal generator to the module interfaces 18 such that each testing module 50 connected to the interface 18 is coupled to the clock signal generator 36. As a consequence, the circuit board frame may provide the testing modules with a common system clock through the interfaces 18. This enables synchronization between the testing modules which may be needed in case multiple testing modules are configured to execute functions of the same testing program. In an embodiment, the clock signal may be output to the base station through at least one testing module during the testing.

In an embodiment, the testing system further comprises a user interface 38. The user interface may be integrated at least partially to the circuit board frame 30, e.g. the circuit board frame 30 may comprise connectors for a display screen and input devices such as a keyboard and/or a pointing device. In other embodiments, the user interface may be integrated to the same housing with the circuit board frame. In yet another embodiment, the user interface may be connected to the circuit board frame 30 through the communication network 110 and the communication interface 35.

In an embodiment, the circuit board frame comprises a memory 40 storing computer program code configuring the functions of the central processing circuitry 32. The memory 40 may further store a database 44 defining test programs. The database 44 may define testing modules that are needed for each testing program. The database 44 may comprise testing functions mapped to each testing module per each testing program. Upon determining to launch a given testing program, the central processing circuitry 32 is thus able to check whether or not the required testing modules have been attached to the interfaces 18 and to program the testing modules with the testing functions. The memory may further comprise a database storing test results for executed test programs.

Referring to the testing modules 50, each testing module may comprise hardware 54 and corresponding hardware drivers 52. The hardware 54 and the hardware drivers 52 may form a static part of the testing module 50. The hardware may comprise connectors that are counterparts to corresponding connectors in the base station to be tested and hardware circuitries needed to communicate with the base station through the connectors. The hardware circuitries may comprise digital signal processing circuitries controlled by the hardware drivers 52. The reprogrammable processing circuitry may comprise a hardware processor 62 and a memory 64. The hardware processor may be realized as programmable logic hardware or as a programmable application-specific integrated circuit. The memory 64 may be reprogrammable memory designed to be reprogrammed by the central processing circuitry through the interface 18 such that the central processing circuitry 32 may load the determined testing functions as a computer program code to the memory 64. In an embodiment, the central processing circuitry 32 is configured to erase the programming of the testing modules after the testing has ended by causing the clearance of the memory 64. As a consequence, the reprogrammable processing circuitry 60 may be considered as blank before programmed by the central processing circuitry 32 and when detached from the circuit board frame. According to another aspect, the testing module may be incapable of communicating with the base station before the programming, and the programming provides the testing module with the capability of communicating with the base station. In an embodiment, the programming of the reprogrammable processing circuitry establishes a logical connection between the reprogrammable processing circuitry and the hardware drivers, when the testing program is executed, thus enabling the reprogrammable processing circuitry to control the hardware drivers 52 and the hardware 50 of the testing module and enabling the testing module to communicate with the base station. The communication capability may refer to capability exchanging digital information with the base station, i.e. information other than mere checking that there is a physical connection to the base station.

The hardware 54 of the testing module 50 may comprise logic to check whether or not the connector is appropriately connected to the base station.

In an embodiment, the circuit board frame comprises a status check logger circuitry 34 configured to detect the testing modules 50 attached to the circuit board frame 30. The status check logger circuitry 34 may be connected to each module interface and communicate with each testing module 50 attached to the interfaces 18. Each testing module may store in a permanent manner an identifier identifying the testing module and its capabilities. The identifier may indicate the interface(s) of the base station to which the testing module attaches. Upon detecting a testing module attached to the interface 17, the status check logger circuitry 34 may be configured to determine whether or not the testing module is powered on. This may be determined by checking whether or not the testing module sends an electric signal to the interface 18, e.g. a signal carrying information on the powered-on status. The status check logger circuitry 34 may be configured to determine whether or not the testing module is connected to the base station. This may be carried out by determining whether or not the testing module sends a determined electric signal to the interface 18. For example, the hardware drivers 52 may be configured to send a signal to the interface 18 upon detecting the above-described appropriate electro-mechanic connection of the hardware connector(s) 54 to the base station. In general, the status check logger 34 may be configured to determine the testing modules attached to the interface 18 and whether or not each attached testing module operates in a prescribed manner. The status check logger circuitry 34 may thus operate as a testing circuitry testing whether or not the testing modules are set up for the testing program. The status check logger circuitry 34 may store the information on the status check of the testing modules to the memory 40 and/or indicate to the central processing circuitry 32 when the testing modules required for the testing program are attached to the interfaces 18 and operational for the testing program. The central processing circuitry 32 may then start the programming of the testing modules with the functions that are needed in the current testing program.

Figure 4:
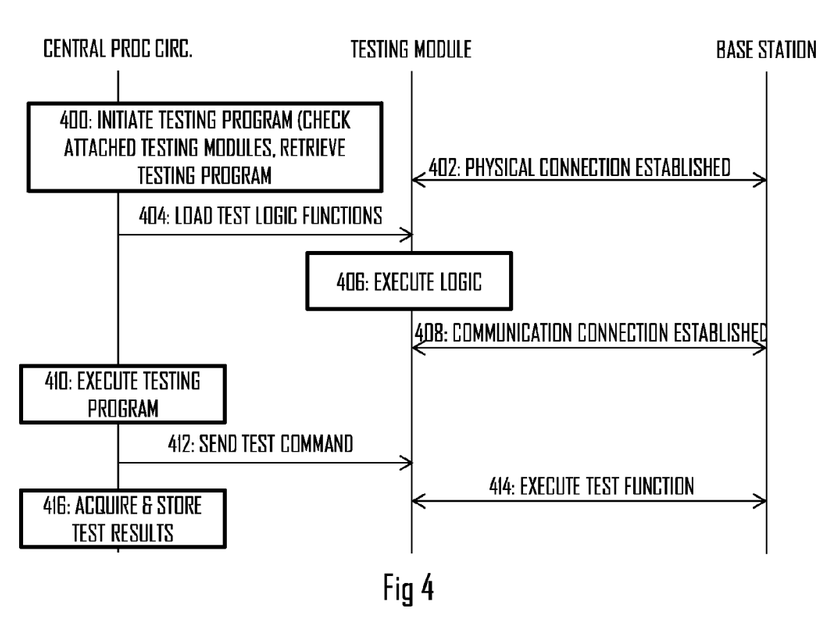
FIGS. 4 to 6 illustrate embodiments for configuring the modular testing system to test a base station.

Let us now describe the operation of the testing systems according to some embodiments of the invention with reference to FIGS. 4 to 7. FIG. 4 illustrates a general signalling diagram illustrating procedures executed in preparation and during the execution of the testing program. Referring to FIG. 4, the central processing circuitry 32 may initiate the testing program by connecting to the database 44 stored in the memory 40 or in a server computer remote from the circuit board frame 30 and accessible through the communication interface 35. The central processing circuitry 32 may retrieve the testing program from the database 44 and determine testing modules required for the testing program. Block 400 may be triggered by a user input through the user interface 38. Upon determining the required testing modules, the central processing circuitry 32 may check whether or not the required testing modules are attached to the circuit board frame, e.g. by communicating with the status check logger circuitry 34. Meanwhile or before block 400, an operator may have selected the testing program and the required testing modules and attached the testing modules to the circuit board frame. The operator may have further connected cables between the testing modules and the corresponding interface connectors in the base station, thus realizing physical connection between the testing module and the base station (step 402). At this stage, the reprogrammable processing circuitry of each attached testing module may be blank, e.g. it may contain no logic to communicate with the base station and/or to configure the hardware drivers of the testing module to carry out the test functions.

Upon detecting that the required testing modules are attached to the circuit board frame 30, the central processing unit 32 may program the reprogrammable processing circuitries of the testing modules (step 404). In an embodiment, step 404 comprises configuring a basic operational logic of the testing modules. This may comprise configuring each reprogrammable processing circuitry with basic operational logic providing capability of executing test functions of the testing program. The basic operational logic may be understood as a framework that defines basic functions and the role of the testing module in the testing program. From another perspective, the basic operational logic may be considered to define a logic diagram or state machine of the testing module. Test signals or other signals or messages input to the testing module during the testing program may then cause the testing module to execute the state machine and provide an appropriate output, e.g. generation of a test signal applied to the base station or analysis of a response received from the base station.

In an embodiment, one of the testing modules may be used as a signal generator and, thus, the central processing circuitry may configure the reprogrammable processing circuitry of the testing module with basic functions of the signal generator, e.g. to generate a test signal, test frame, or a test message of a determined communication protocol. Another testing module may be configured to operate as a protocol analyser configured to capture data packets from an interface of the base station and analyse the captured data packets in order to determine whether or not they comply with a determined communication protocol. The communication protocol may be any protocol employed in radio communication networks such as asynchronous transfer mode (ATM), radio access network application part (RANAP), Internet protocol (IP), Node B application part (NBAP), NodeB control port (NCP), access link control application protocol (ALCAP), radio link control protocol (RLC), or it may be a communication protocol employed in other telecommunication networks, e.g. the PON.

As a result of the programming, the reprogrammable processing circuitry becomes configured to execute the programming logic (step 406). As a consequence of the programming logic, the testing module is enabled to establish a communication connection with the base station (step 408). The type of communication may depend on the role of the testing module in the testing program, e.g. transmit only, receive only, transmit and receive.

When all the testing modules are configured, the central processing circuitry 32 may determine that the test configuration is complete and the execution of the testing program may begin. In another embodiment, the execution of the testing program may be time-based, e.g. the testing program is launched at a predetermined time or after a determined delay counted from the completion of the testing module configuration(s). As a result, the testing program may be executed (block 410). During the execution, the central processing unit may send test commands to at least some of the testing modules and receive rest results from at least some of the testing modules. In step 412, the central processing circuitry may send a test command to the testing module. The testing command may cause the testing module to execute at least one test function which comprises input and/or output of test signals with the base station (step 414), depending on the role and the test command. A plurality of such test commands and corresponding test functions may be executed during the testing program. A single test command may cause the execution of a plurality of test functions in the testing module. Typically, the amount of signaling between the base station and the testing module is high with respect to the signaling between the central processing circuitry and the testing module. Also, the interface between the testing module and the base station may support much higher data rates than the interface 18, e.g. 40 Gigabit per second (Gbps) or higher. As examples, the data rates between the testing module and the base station may be 1 Gbps, 10 Gbps, 40 Gbps, 100 Gbps, 400 Gbps while the interface 18 may support data rates below the 1 Gbps.

The central processing circuitry 32 may acquire test results from the testing modules during the execution of the test functions and/or after the test functions have been executed between the base station and the testing modules. The test results may be output to the user interface 38 and/or stored in the test result database 46 (block 416).

Figure 5:
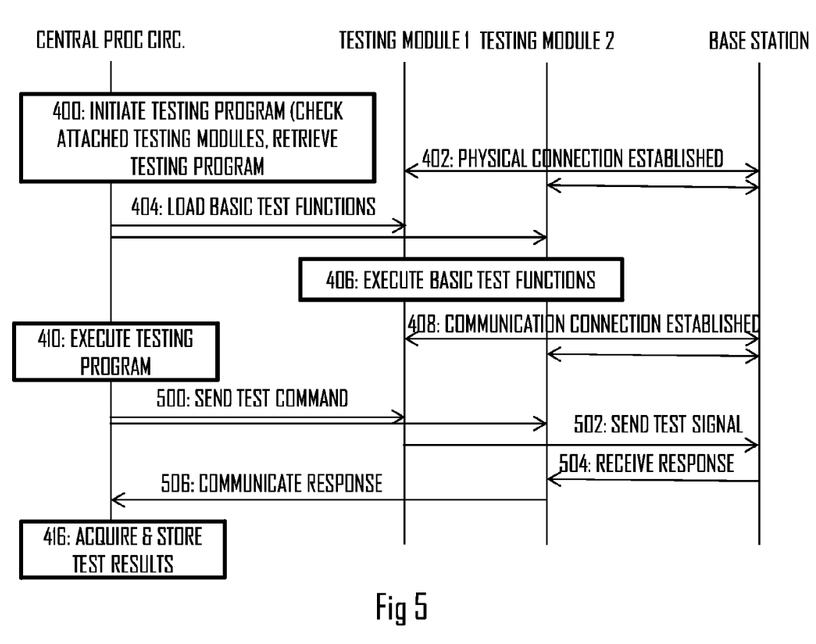

The modular testing system in which the plurality of testing modules may be attached to the circuit board frame enables versatile testing scenarios. In an embodiment, the plurality of testing modules may be required to carry out one testing program. In view of this purpose, the central processing circuitry may be configured to split the testing program into a plurality of sub-programs, to distribute the sub-programs amongst the plurality of testing modules by programming each reprogrammable processing circuitry to execute at least one sub-program, and to receive test results from the reprogrammable processing circuitries during the execution of the sub-programs. FIG. 5 illustrates an embodiment of this feature. In FIG. 5, steps denoted with the same reference numerals as in FIG. 4 represent the same or substantially similar operations.

Referring to FIG. 5, a plurality of testing modules 1 and 2 is attached to the circuit board frame for the execution of the testing program. The testing modules 1 and 2 may be connected to different connectors in the base station. In step 404, the central processing unit configures the operational logic of the reprogrammable processing circuitries of the testing modules. In this case, a first testing module 1 is configured to operate as an output module configured to output test signals to the base station. As a consequence, the testing module 1 is configured with capability of generating test signals and outputting the test signals to the base station. A second testing module 2 is configured to operate as an input module configured to receive test signals from the base station and analyse the test signals. The testing module 2 is thus configured with the corresponding capability.

In another testing program, the first testing module may be configured with the reception and analysing capability while the second testing module is configured with the test signal generation capability. Accordingly, the same physical hardware may be configured with different roles and/or basic functionalities depending on the testing program, thus improving the versatility of the testing system.

During the execution of the testing program, the central processing circuitry may send the test command to the testing module 1 and 2 (step 500). This causes the testing module to generate a test signal and send the test signal to the base station (step 502). The test signal may be a protocol message or a test signal carrying no information e.g. a clock signal or an impulse signal with desired frequency characteristics. The testing module 2 may be configured by the test command to monitor for the base station's response to the test signal and receive the response in step 504. The testing module 2 may be provided with reference information on the expected response, and it may compare the received response with the expected response. The testing module 2 may store the result of the comparison in a memory. In this manner, a plurality of test functions may be performed. The testing module 2 may output the results of the analysis to the central processing circuitry 32 in step 506, and the central processing circuitry may store the test results in the test result database 46 and/or output the test results to the user interface 38.

In an embodiment, the central processing circuitry is configured to reconfigure the first testing module on the basis of the test results received from the second test module. The reconfiguration may comprise sending a new test command having contents that depend on the test results received form the second testing module or reconfiguring the programming logic of the first testing module (e.g. reiterating step 404). This enables changing the basic functionalities or the role of the first testing module during the testing. In another embodiment, the central processing circuitry is configured to change the testing program on the basis of the test results. For example, the test results may show that a certain protocol is not functioning properly in the base station. As a consequence, the central processing circuitry may be configured to modify the testing program by selecting a new set of test functions that test the specific feature that is found to be providing unexpected test results. As another example, a first test command sent by the first testing module may test the speed of the response of the base station. The response may be received by the first testing module of another testing module. If the speed is above a determined threshold, the first testing module may be configured to execute a first subsequent test setup. If the speed is below the threshold, the first testing module may be configured to execute a second subsequent test setup different from the first one. If the response indicates errors or failures in the initial test above a certain limit, the first testing module may be configured to test other parameters first such as channel speed.

In general, the central processing circuitry may handle overall control in the execution of the testing program. It may send test commands to the testing modules to trigger new test functions of the same testing program when previous test functions have been executed and corresponding test results acquired.

Figure 6:
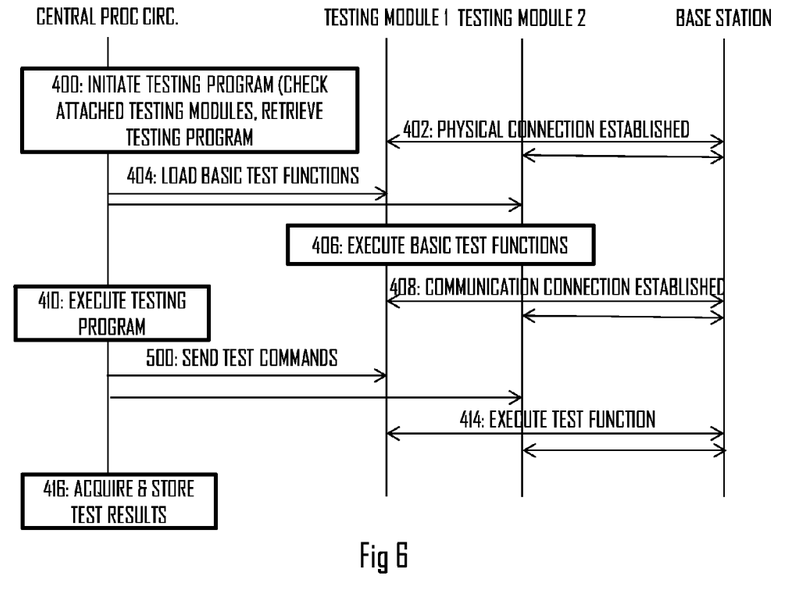

In an embodiment, the plurality of testing modules may be divided into at least two sub-groups, wherein each sub-group is programmed to carry out a testing program which is independent of the testing program(s) of the other sub-group(s). Such parallel testing expedites the testing of the base station while the number of required hardware is reduced. In view of this purpose, the central processing circuitry may configured to determine a first testing program testing at least one function of the base station and to program at least a first testing module to execute functions of the first testing program. The central processing circuitry may further determine a second testing program testing at least one other function of the base station and to program at least a second testing module to execute functions of the second testing program. During the testing, the central processing circuitry may control simultaneous execution of the first testing program and the second testing program. FIG. 6 illustrates such an embodiment.

Referring to FIG. 6, the central processing circuitry may be configured in step 500 to send a first test command of the first testing program to the first testing module 1 and to send a second test command of the second testing program to the second testing module 2. The first and second test command may be sent independently of each other such that transmission of neither test command has no prerequisite related the other test command. In step 414, the testing modules 1 and 2 execute the test functions of the first and second testing program, respectively, and they may send test results to the central processing circuitry. The central processing circuitry 32 may store and/or output the test results, as described above. In reality, more than two testing modules may be configured to execute simultaneous testing in parallel in this manner.

In an embodiment, the first testing program and the second testing program are configured to test the same communication protocol of the base station. In another embodiment, the first testing program is configured to test a first communication protocol of the base station, and the second testing program is configured to test a second communication protocol of the base station.

In the embodiment of FIG. 6 described above, the first testing program and the second testing program are mutually independent testing programs, e.g. they test different features of the base station. In another embodiment, the central processing circuitry is configured to split a testing program into a plurality of sub-programs, to distribute the sub-programs amongst the plurality of testing modules by programming each reprogrammable processing circuitry to execute at least one sub-program, and to receive test results from the reprogrammable processing circuitries during the execution of the sub-programs. In this embodiment, the central processing circuitry may reprogram at least some of the testing modules on the basis of the test results received from at least one testing module, as described above.

As described above, the central processing circuitry 32 may be configured to execute centralized command of the test functions and/or testing programs executed by the plurality of testing modules. The central processing circuitry 32 may manage and schedule the testing program(s) and/or test to the testing modules and control the testing modules to execute various test functions and/or testing programs in parallel. This provides for optimized timing and resource allocation.

Figure 7:
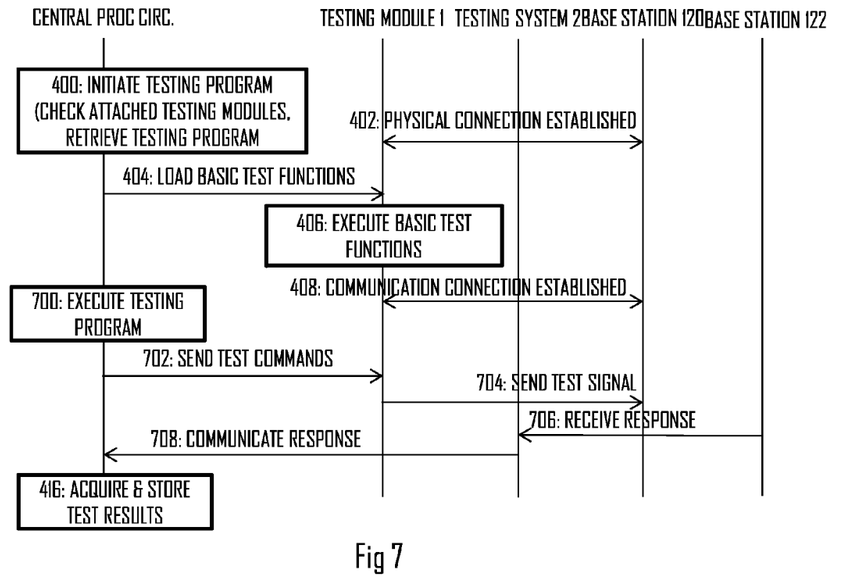
FIG. 7 illustrates an embodiment for configuring a plurality of modular testing systems to test a plurality of base stations or a base station network.

FIG. 7 illustrates an embodiment where the testing system is employed in the testing scenario of FIG. 2. As described above, one testing system 100 may be connected to one base station 120 while another testing system 200 may be connected to another base station, and a communication connection may be provided between the testing systems. In the context of the present invention, each testing system 100, 200 may comprise the circuit board frame 30 and at least one testing modules connected to each circuit board frame. The number of employed testing systems may be higher than two. The central processing circuitries of the circuit board frames may communicate with one another through the communication interfaces and one or more communication networks 110. The central processing circuitries may be configured to execute the same testing program but each central processing circuitry may be configured to execute different parts of the testing program. One of the central processing circuitries may operate as a master device controlling the execution of the testing program and commanding the other central processing circuitries during the testing. Each testing system may operate according to any one of the embodiments of FIGS. 4 to 6. The user interface 38 may be provided in or connected to the central processing circuitry operating as the master device.

Referring to FIG. 7, the central processing circuitry of the master device may carry out blocks 400 and 404 in the above-described manner. Additionally, the central processing circuitry of the master device may instruct the central processing circuitry/circuitries other testing system(s) to execute the operations of the blocks 400 and 404. In block 700, the central processing circuitry of the master device may execute the testing program. Block 700 may comprise instructing the other central processing circuitries to execute the testing program as well. Let us assume a test scenario where the testing module of the master device is configured to cause the base station 120, to which it is connected, to transmit a data packet to another base station 122 connected to the other testing system. In step 702, the central processing circuitry of the master device instructs the testing module to send a test signal to the base station 120 (step 704). The test signal may be a protocol message addressed to the base station 122 or a terminal device connected to the base station 122. The test signal may cause a response in the base stations 120 and 122, and the testing system 200 may be configured to monitor for the response of the base station 122 to the test signal (step 706). Upon detecting the response, the testing system 200 may analyze the response and communicate the response to the central processing circuitry of the master device (step 708).

As used in this application, the term 'circuitry' refers to all of the following: (a) hardware-only circuit implementations such as implementations in only analog and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an application-specific integrated circuit (ASIC), and/or a field-programmable grid array (FPGA) circuit for the apparatus according to an embodiment of the invention.

The processes or methods described in FIGS. 4 to 7 may also be carried out in the form of a computer process defined by a computer program. The computer program may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

The present invention is applicable to testing scenarios defined above but also to other suitable testing scenarios. The protocols and the specifications of wireless systems and their base stations develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. The invention and its embodiments are not limited to the examples described above but may vary within the scope of the claims.

The invention claimed is:

1. A system for testing a base station apparatus, the system comprising:
   a circuit board frame comprising a plurality of interfaces for a plurality of testing modules; and
   a central processing circuitry, said plurality of testing modules detachably attachable to the interfaces,
      wherein each testing module comprises hardware configured to connect a determined interface of the base station apparatus and a reprogrammable processing circuitry,
      wherein the central processing circuitry is configured to determine a testing program to execute and testing modules required for the testing program, determine whether or not the required testing modules are attached to the circuit board frame, and program reprogrammable processing circuitries of the required testing modules to execute testing functions of the testing program in response to determining that the required testing modules are attached to the circuit board frame.

2. The system of claim 1, wherein the central processing circuitry is configured to erase the programming of the testing modules after the testing has ended.

3. The system of claim 1, wherein the reprogrammable processing circuitries of the testing modules are blank before programmed by the central processing circuitry.

4. The system of claim 1, wherein said programming of the testing module provides the testing module with capability of communicating with the base station apparatus.

5. The system of claim 1, wherein at least one of the testing modules is programmable, by the central processing circuitry, to operate as an input and an output with respect to the base station apparatus, and wherein the central processing circuitry is configured to determine from the testing program whether to program the at least one testing module to function as the input or output device.

6. The system of claim 1, wherein the circuit board frame comprises a clock signal generator providing the testing modules with a common system clock.

7. The system of claim 1, wherein the central processing circuitry is configured to determine a first testing program testing at least one function of the base station and to program at least a first testing module to execute functions of the first testing program, to determine a second testing program testing at least one other function of the base station and to program at least a second testing module to execute functions of the second testing program, and to control simultaneous execution of the first testing program and the second testing program.

8. The system of claim 7, wherein the first testing program is configured to test a first communication protocol of the base station apparatus, and the second testing program is configured to test a second communication protocol of the base station apparatus.

9. The system of claim 1, wherein the central processing circuitry is configured to split the testing program into a plurality of sub-programs, to distribute the sub-programs amongst the plurality of testing modules by programming each reprogrammable processing circuitry to execute at least one sub-program, and to receive test results from the reprogrammable processing circuitries during the execution of the sub-programs.

10. The system of claim 1, wherein the central processing circuitry is configured to reprogram at least one of the reprogrammable processing circuitries during the execution of the testing program on the basis of test results of testing the base station apparatus received from at least one testing module.

11. The system of claim 1, further comprising a communication interface configured to connect to a communication network, wherein the central processing circuitry is configured to connect to a central processing circuitry of a second circuit board frame through the communication interface and exchange information with the other central processing circuitry during execution of the testing program.

12. The system of claim 11, wherein the information exchanged with the other central processing circuitry comprises at least one of the following: a command sent to the other central processing circuitry and configuring the other central processing circuitry to program at least one testing module according to the determined testing program; a command sent to the other central processing circuitry to execute at least one test function of the determined testing program; a test result received from the other central processing circuitry in connection with the determined testing program.

* * * * *